(12) United States Patent
Kakimoto et al.

(10) Patent No.: US 12,703,423 B2
(45) Date of Patent: Aug. 11, 2026

(54) TURNING CONTROL DEVICE

(71) Applicant: JTEKT CORPORATION, Kariya (JP)

(72) Inventors: Yusuke Kakimoto, Okazaki (JP); Takashi Kodera, Okazaki (JP); Shinya Aono, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 5 days.

(21) Appl. No.: 19/049,215

(22) Filed: Feb. 10, 2025

(65) Prior Publication Data

US 2025/0256765 A1 Aug. 14, 2025

(30) Foreign Application Priority Data

Feb. 14, 2024 (JP) ................................ 2024-020172

(51) Int. Cl.
*B62D 5/04* (2006.01)
*B62D 15/02* (2006.01)

(52) U.S. Cl.
CPC ......... *B62D 5/0463* (2013.01); *B62D 5/0424* (2013.01); *B62D 15/0215* (2013.01)

(58) Field of Classification Search
CPC .. B62D 5/0463; B62D 5/0424; B62D 5/0472; B62D 15/0215; B62D 15/025; B62D 15/0265; B62D 6/007; B62D 1/16
USPC ........................................ 701/41, 42, 43, 44
See application file for complete search history.

(56) References Cited

U.S. PATENT DOCUMENTS

| | | | | |
|---|---|---|---|---|
| 6,186,267 B1 * | 2/2001 | Hackl | B62D 5/008 | 180/444 |
| 7,721,841 B2 * | 5/2010 | Shibata | B62D 6/008 | 180/407 |
| 2020/0223477 A1 * | 7/2020 | Tamaizumi | B62D 5/0463 | |
| 2024/0043394 A1 * | 2/2024 | Tepe | C07D 279/16 | |

FOREIGN PATENT DOCUMENTS

| | | |
|---|---|---|
| EP | 3 680 148 A1 | 7/2020 |
| EP | 4 311 739 A1 | 1/2024 |
| JP | 2003-205846 A | 7/2003 |

OTHER PUBLICATIONS

Jul. 3, 2025 Extended Search Report issued in European Patent Application No. 25157028.9.

* cited by examiner

*Primary Examiner* — Hai H Huynh
(74) *Attorney, Agent, or Firm* — Oliff PLC

(57) ABSTRACT

A processor included in a turning control device is configured to execute a manipulation process of manipulating a drive circuit of an assist motor depending on a torque that depends on at least one of the two values, the value of an assist torque variable and the value of a control torque variable. The processor is configured to execute a variation torque control process of varying a torque as an input variable in the manipulation process, depending on a steering angle, based on the value of the steering angle variable as an input variable. The processor is configured to execute a restriction process of restricting the magnitude of variation in the torque as the input variable in the manipulation process depending on the steering angle, to a small side, depending on the priority degree of the value of the control torque variable in the manipulation process.

6 Claims, 6 Drawing Sheets

PU
50
52
54
STORAGE DEVICE
ASSIST CONTROL PROGRAM
54a
MAPPING DATA
54b
80
CAMERA
84
10
12
14
82
θh
OT
12
16
18
20
22
72
Trq
30
36
34
46
44
40
θm
70
42
60
iu, iv, iw
30a
22a
32
34
36

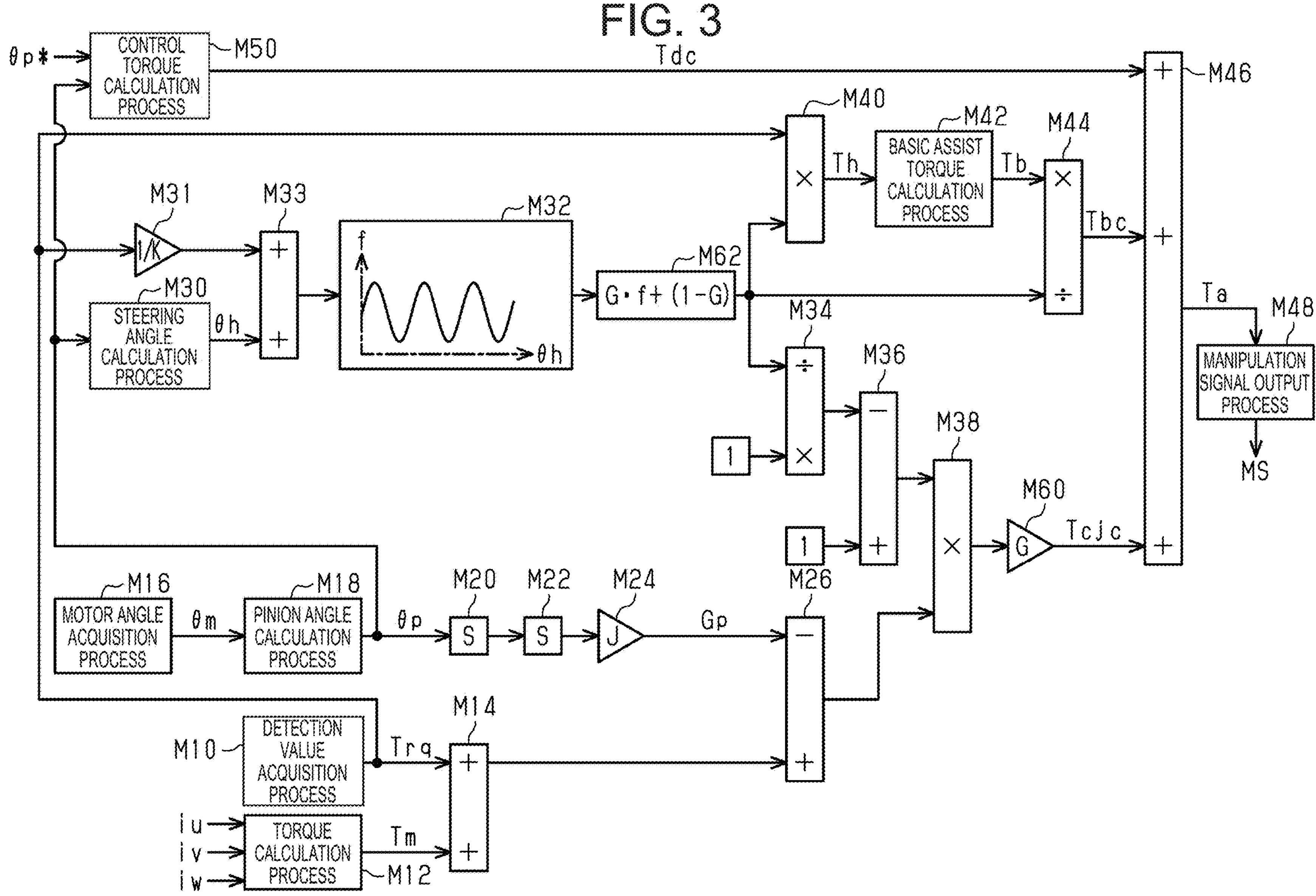
FIG. 3
θp*
CONTROL TORQUE CALCULATION PROCESS
M50
Tdc
M46
M40
M42
BASIC ASSIST TORQUE CALCULATION PROCESS
M44
Th
Tb
Tbc
M31
1/K
M33
M32
f
θh
M62
G・f+(1−G)
M30
STEERING ANGLE CALCULATION PROCESS
θh
M34
M36
Ta
M48
MANIPULATION SIGNAL OUTPUT PROCESS
MS
1
M38
M60
G
Tcjc
1
M16
MOTOR ANGLE ACQUISITION PROCESS
θm
M18
PINION ANGLE CALCULATION PROCESS
θp
M20
S
M22
S
M24
J
Gp
M26
M10
DETECTION VALUE ACQUISITION PROCESS
Trq
M14
iu
iv
iw
TORQUE CALCULATION PROCESS
Tm
M12

START
S10
TRACKABILITY PRIORITY MODE?
NO
YES
S18
|Th| ≤ ThthL OR EMERGENCY AVOIDANCE REQUEST?
S12
NO
|Th| ≥ ThthH?
NO
1
YES
S14
STEERING-FEELING PRIORITY MODE
YES
S20
TRACKABILITY PRIORITY MODE
1
S16
G←MIN (G+Δ, 1)
S22
G←MAX (G−Δ, 0)
END FIG. 6
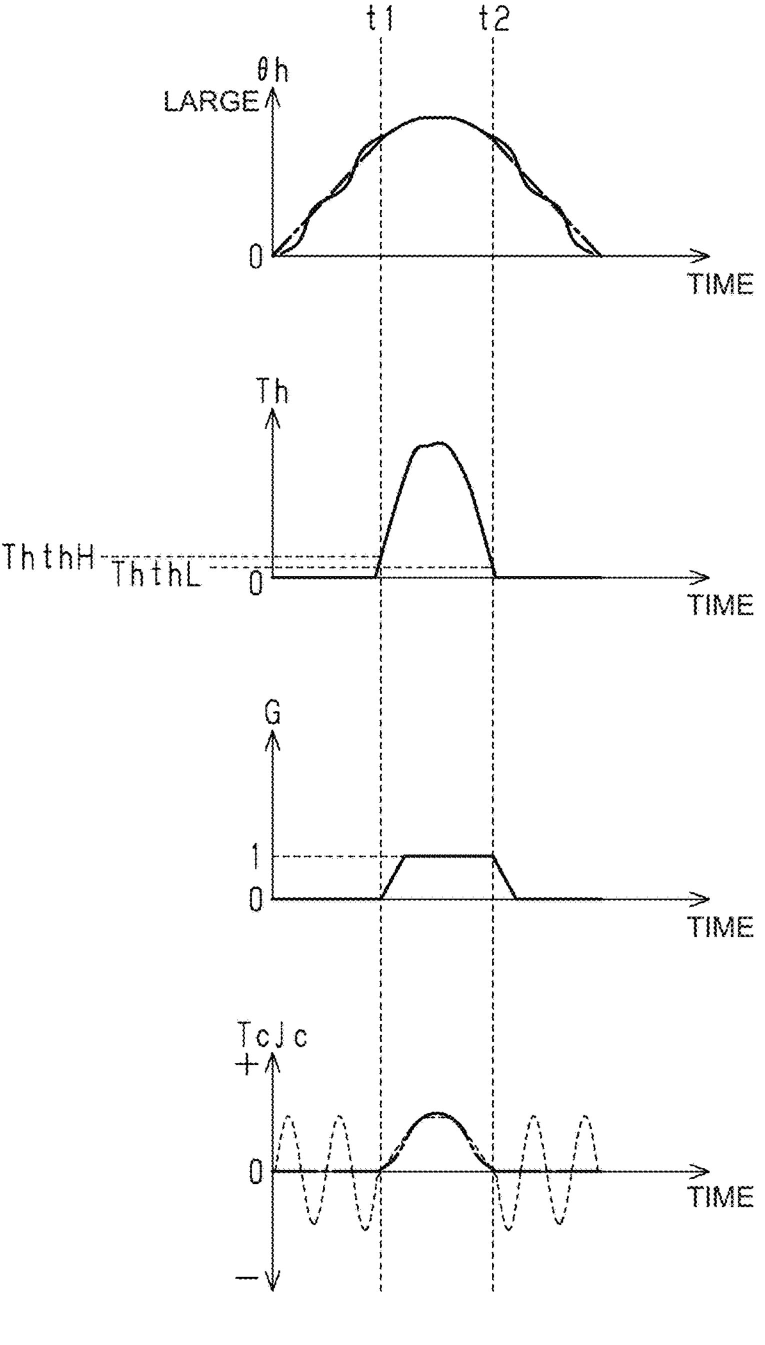
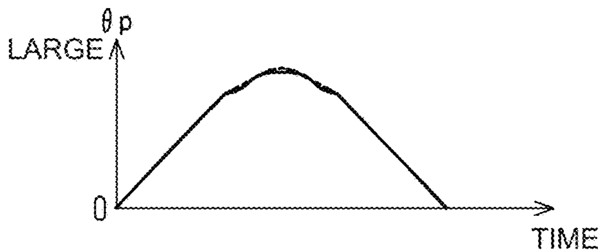

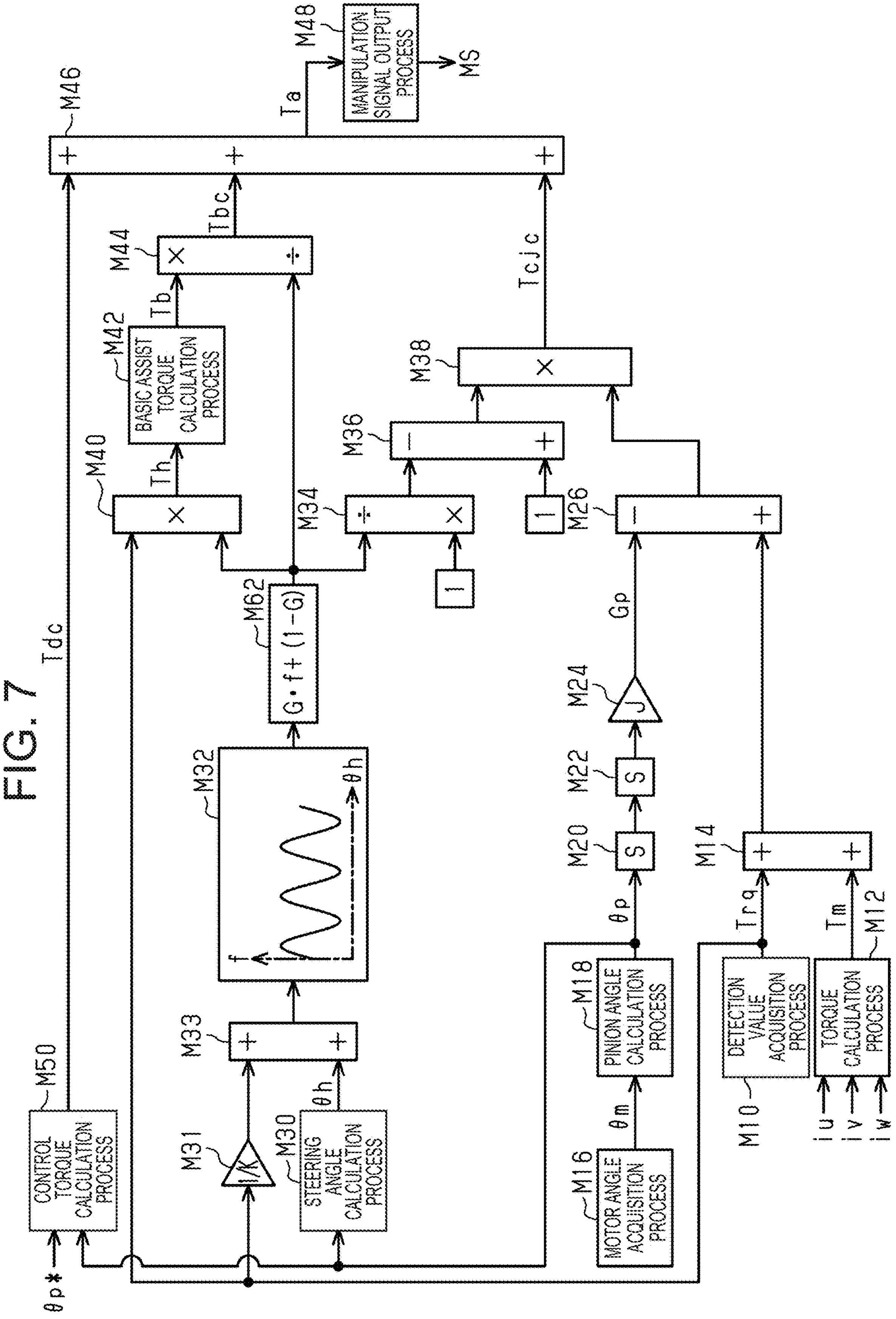
FIG. 7
CONTROL TORQUE CALCULATION PROCESS
STEERING ANGLE CALCULATION PROCESS
MOTOR ANGLE ACQUISITION PROCESS
PINION ANGLE CALCULATION PROCESS
DETECTION VALUE ACQUISITION PROCESS
TORQUE CALCULATION PROCESS
BASIC ASSIST TORQUE CALCULATION PROCESS
MANIPULATION SIGNAL OUTPUT PROCESS
G・f+(1−G)
M10
M12
M14
M16
M18
M20
M22
M24
M26
M30
M31
M32
M33
M34
M36
M38
M40
M42
M44
M46
M48
M50
M62
θp*
θh
θm
θp
Trq
Tm
iu
iv
iw
Gp
Tdc
Th
Tb
Tbc
Tcjc
Ta
MS
1/K
J
S
f

TURNING CONTROL DEVICE

CROSS-REFERENCE TO RELATED APPLICATION

This application claims priority to Japanese Patent Application No. 2024-020172 filed on Feb. 14, 2024. The disclosure of the above-identified application, including the specification, drawings, and claims, is incorporated by reference herein in its entirety.

BACKGROUND

1. Technical Field

The present disclosure relates to a turning control device.

2. Description of Related Art

For example, Japanese Unexamined Patent Application Publication No. 2003-205846 (JP 2003-205846 A) describes a device that transmits the torque of a steering wheel to a turning wheel through a steering shaft, an intermediate shaft, and a transmitting shaft. The steering shaft and the intermediate shaft, and the intermediate shaft and the transmitting shaft, are each coupled by a universal joint. Further, the device includes a motor that gives a torque to the intermediate shaft.

SUMMARY

In the case where the universal joint is included as described above, the ratio between a torque that is given to the steering shaft and a torque that is given to the transmitting shaft varies depending on the steering angle. The inventor has studied to give the torque of the motor to a position that is closer to the turning wheel than the universal joint is. In that case, when the torque at the position that is closer to the turning wheel is controlled so as not to vary depending on the steering angle, the torque that is given to the steering shaft varies depending on the steering angle. When the torque that is given to the steering shaft varies depending on the steering angle, a driver can have a feeling of strangeness.

A turning control device according to a first aspect of the present disclosure controls a turning device. The turning device includes a steering wheel, an input shaft, an intermediate shaft, an output shaft, a first Cardan joint, a second Cardan joint, an assist motor, and a turning wheel. The input shaft is coupled to the steering wheel. The first Cardan joint is a member that couples the input shaft and the intermediate shaft. The second Cardan joint is a member that couples the intermediate shaft and the output shaft. The turning wheel is a member to which a steering torque input to the steering wheel is transmitted through the input shaft, the intermediate shaft, and the output shaft. The assist motor is a motor configured to give a torque to a position that is closer to the turning wheel than the second Cardan joint is. The turning control device includes a processor configured to execute a rudder angle variable acquisition process, an assist torque variable calculation process, a control torque acquisition process, a manipulation process, a variation torque control process, and a restriction process. The rudder angle variable acquisition process is a process of acquiring the value of a steering angle variable. The steering angle variable is a variable indicating a steering angle that is the angle of the steering wheel. The assist torque variable calculation process is a process of calculating the value of an assist torque variable. The assist torque variable is a variable indicating a torque for assisting steering by a driver depending on manipulation of the steering wheel. The control torque acquisition process is a process of acquiring the value of a control torque variable. The control torque variable is a variable indicating a torque for controlling a traveling direction of a vehicle independently from the manipulation of the steering wheel. The manipulation process is a process of manipulating a drive circuit of the assist motor depending on a torque that depends on at least one of the two values, the value of the assist torque variable and the value of the control torque variable. The variation torque control process is a process of varying a torque as an input variable in the manipulation process, depending on the steering angle, based on the value of the steering angle variable as an input variable. The restriction process is a process of restricting the magnitude of variation in the torque as the input variable in the manipulation process depending on the steering angle, to a small side, depending on the priority degree of the value of the control torque variable in the manipulation process.

In the above configuration, the ratio between the torque at the position that is closer to the turning wheel than the second Cardan joint is and the steering torque varies depending on the value of the steering angle variable. Therefore, when the variation in the steering torque is restrained, the torque at the position that is closer to the turning wheel than the second Cardan joint varies. Therefore, in the above configuration, the torque of the assist motor is varied depending on the steering angle. Thereby, it is possible to restrain the variation in the steering torque.

However, the variation in the torque of the assist motor can interfere with an intended behavior control of the vehicle with the value of the control torque variable. Hence, in the above configuration, the magnitude of the above variation is restricted to the small side depending on the priority degree of the value of the control torque variable. Thereby, it is possible to achieve a suitable balance between the restraint of the variation in the steering torque and the maintenance of a high controllability with the value of the control torque variable.

In the turning control device according to the first aspect of the present disclosure, the processor may be configured to execute a steering torque variable acquisition process. The steering torque variable acquisition process may be a process of acquiring the value of a steering torque variable that is a variable indicating the steering torque. The restriction process may include a process of recognizing the priority degree depending on the value of the steering torque variable as an input variable.

The steering torque is a variable indicating driver's steering intention. Therefore, the value of the steering torque variable is a variable appropriate to determine the priority degrees of the steering by the driver and the steering with the value of the control torque variable. Therefore, in the above configuration, it is possible to appropriately set the priority degrees.

In the turning control device according to the first aspect of the present disclosure, the restriction process may include a process of recognizing the priority degree of the value of the control torque variable, based on a signal that determines the priority degree of the value of the control torque variable depending on information about the exterior of the vehicle.

The information about the exterior of the vehicle can include information indicating whether priority is given to the value of the control torque variable regardless of driver's steering intention. Therefore, in the above configuration, it is possible to appropriately set the priority degree.

In the turning control device according to the first aspect of the present disclosure, the restriction process may include a process of gradually decreasing the magnitude of the variation to zero, at a time of switching from a state where the priority degree of the value of the control torque variable is lower than the priority degree of the value of the assist torque variable to a state where the priority degree of the value of the control torque variable is higher than the priority degree of the value of the assist torque variable.

In the above configuration, the magnitude of the variation is gradually decreased at the time of the switching to the state where the priority degree of the value of the control torque variable is higher, and thereby, it is possible to perform the transition to a state where the controllability with the value of the control torque variable is high, while avoiding a sudden change in control state.

In the turning control device according to the first aspect of the present disclosure, the restriction process may include a process of gradually increasing the magnitude of the variation from zero, at a time of switching from a state where the priority degree of the value of the control torque variable is higher than the priority degree of the value of the assist torque variable to a state where the priority degree of the value of the control torque variable is lower than the priority degree of the value of the assist torque variable.

In the above configuration, the magnitude of the variation is gradually increased at the time of the switching to the state where the priority degree of the value of the control torque variable is lower. Thereby, it is possible to perform the transition to a state where the variation that is given to the steering wheel is restrained, while avoiding a sudden change in control state.

In the turning control device according to the first aspect of the present disclosure, the value of the control torque variable may be a torque that is added to the value of the assist torque variable for correcting the steering depending on the manipulation of the steering wheel.

In the case where the value of the control torque variable is superimposed on the assist torque, the manipulation process can be a process of manipulating the drive circuit in consideration of both torques. However, even in the case where both torques are considered, whether priority should be given to a steering feeling or to the controllability with the value of the control torque variable changes depending on situation. Therefore, the advantage of the restriction of the magnitude of the variation depending on the priority degree is particularly large.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a block diagram showing processes that are executed by a control device according to the embodiment;

FIG. 6 is a time chart showing an effect of the embodiment; and

FIG. 7 is a block diagram showing processes that are executed by a control device according to a second embodiment.

DETAILED DESCRIPTION OF EMBODIMENTS

System Configuration

Figure 1:
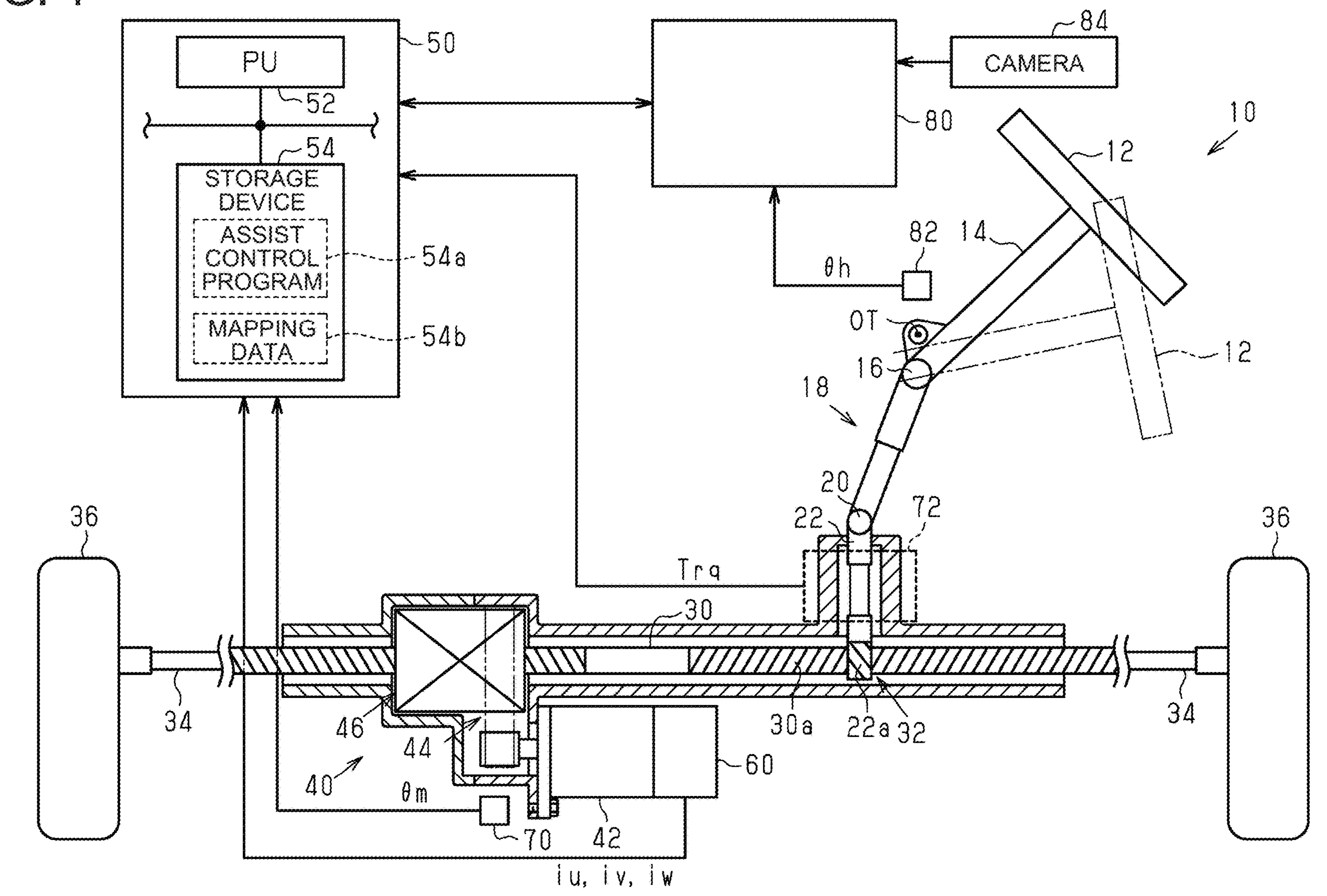
FIG. 1 is a diagram showing the configuration of a turning control system according to an embodiment.

As shown in FIG. 1, the turning device 10 is a device that turns turning wheels 36 in the cooperation between the steering torque that is input to a steering wheel 12 by a driver and the dynamic power of a turning actuator 40. The turning device 10 is an electric power steering device. Hereinafter, manipulating the steering wheel 12 in the right direction or the left direction is referred to as "steering".

The steering wheel 12 is fixed to a column shaft 14. The column shaft 14 is mechanically coupled to an intermediate shaft 18 through a first Cardan joint 16. The intermediate shaft 18 has a well-known contractible configuration. Of two end portions of the intermediate shaft 18 in the axial direction of the intermediate shaft 18, an end portion on the reverse side of an end portion that is coupled to the first Cardan joint 16 is coupled to a pinion shaft 22 through a second Cardan joint 20.

The pinion shaft 22 is disposed so as to have a predetermined crossing angle with a rack shaft 30. A rack-and-pinion mechanism 32 is configured by the engagement between a rack tooth **30*a* formed on the rack shaft 30 and a pinion tooth 22*a* formed on the pinion shaft 22. Further, tie rods 34 are coupled to both ends of the rack shaft 30. Distal ends of the tie rods 34 are coupled to unillustrated knuckles to which the turning wheels 36 are secured. By the rack-and-pinion mechanism 32, the rotation manipulation of the steering wheel 12 is transformed into the displacement action of the rack shaft 30 in the axial direction of the rack shaft 30. The displacement action in the axial direction is transmitted to the knuckles through the tie rods 34, and thereby, the turning angle of the turning wheel 36 is changed. The turning angle is the moving angle of a tire that is the turning wheel 36**.

The turning actuator 40 includes an assist motor 42 that is a drive source, a transmission mechanism 44 that transmits the torque of the assist motor 42, and a ball screw mechanism 46. The ball screw mechanism 46 transforms the torque of the assist motor 42 that is transmitted through the transmission mechanism 44, into the power for the displacement of the rack shaft 30 in the axial direction. As an example, the assist motor 42 is a three-phase brushless motor. The output voltage of an inverter 60 as a drive circuit is applied to a terminal of the assist motor 42.

The control device 50 includes a PU 52 and a storage device 54. The PU 52 is a software processing device that includes at least one of a CPU, a GPU, and the like. The control device 50 manipulates the inverter 60 for controlling the controlled amount of the turning wheel 36 as a controlled object. For the control of the controlled amount, the control device 50 refers to a rotation angle $\theta_m$ of the assist motor 42 that is detected by a rotation angle sensor 70. Further, the control device 50 refers to electric currents iu, iv, iw that are output by the inverter 60. The electric currents iu, iv, iw may be detected as voltage drop amounts at shunt resistors provided on respective legs of the inverter 60. Further, the control device 50 refers to a detection value Trq of a torque sensor 72. The detection value Trq is a detection value of the torque that is given to the pinion shaft 22. The torque sensor

72 is a sensor that detects the torque depending on the torsion angle of a well-known torsion bar provided at the pinion shaft 22.

A superior ECU 80 is an electronic control device that generates a command that is relevant to the control of the vehicle and that is superior to the control device 50. The superior ECU 80 refers to a steering angle $\theta_h$ that is detected by a rudder angle sensor 82. The steering angle $\theta_h$ is the rotational angle of the steering wheel 12. In other words, the steering angle $\theta_h$ is the rotational angle of the column shaft 14. The superior ECU 80 executes a process for controlling the traveling direction of the vehicle based on image data acquired by a camera 84 that indicates an image of the forward view of the vehicle.

The control device 50 and the superior ECU 80 can communicate with each other. Moreover, the control device 50 can receive the steering angle $\theta_h$ that is acquired by the superior ECU 80. The sampling period of the steering angle $\theta_h$ is longer than the sampling period of the rotation angle $\theta_m$.

Cardan Joint

Figure 2:
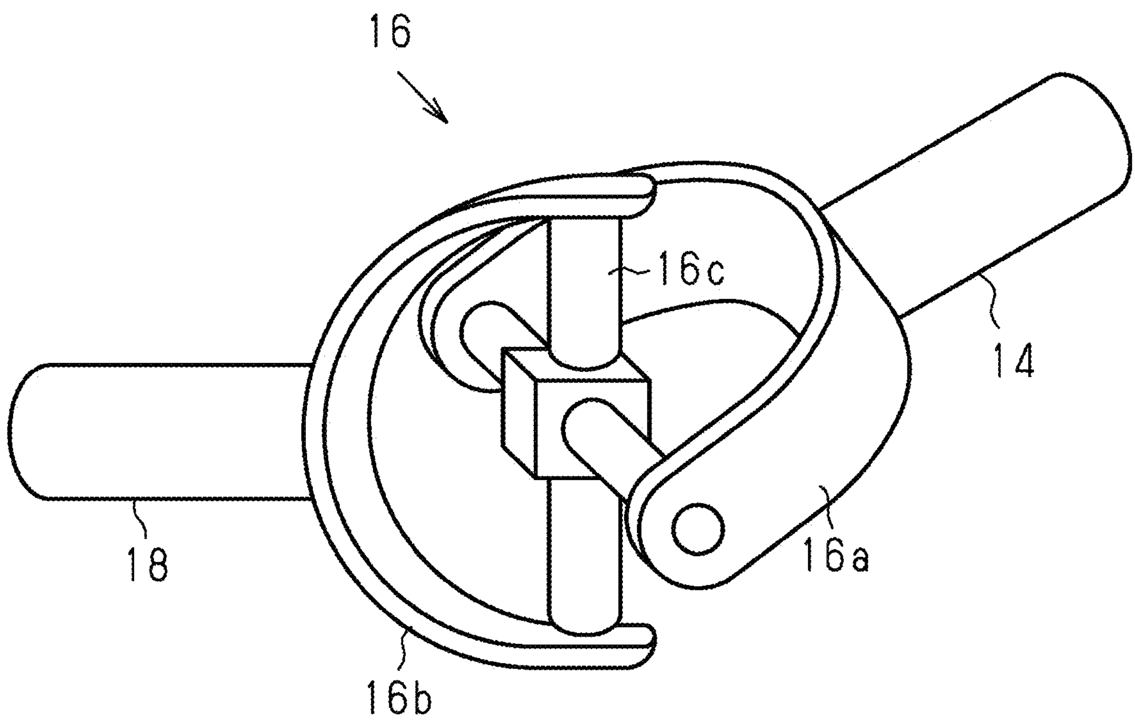
FIG. 2 is a diagram showing the configuration of a first Cardan joint according to the embodiment.

FIG. 2 shows the configuration of the first Cardan joint 16. The first Cardan joint 16 includes a first yoke 16*a*, a second yoke 16*b*, and a joint cross 16*c*. The joint cross 16*c* has a cross shape. The joint cross 16*c* couples the first yoke 16*a* and the second yoke 16*b* in a mutually rotatable manner. The first yoke 16*a* is fastened to an end portion of the column shaft 14 by a bolt. The first yoke 16*a* may be welded to the end portion of the column shaft 14. The second yoke 16*b* is fixed to an end portion of the intermediate shaft 18 by welding.

The configuration of the second Cardan joint 20 is the same as the configuration of the first Cardan joint 16, and therefore, the description about the configuration of the second Cardan joint 20 is omitted.

Variation in Torque Due to Cardan Joint

A ratio f(θh) (=Th/Trq) between a steering torque Th that is a torque that is given to the steering wheel 12 and a torque that is given to the pinion shaft 22 has a relation that is expressed as the following Expression (c1).

$$f(\theta h) = \frac{\cos\alpha 1 \cdot \cos\alpha 2}{\left(1 - \sin^2\alpha 1 \cdot \sin^2\theta h\right) \cdot \left[1 - \sin^2\alpha 2\{\sin(\arctan(\tan\theta h \cdot \cos\alpha 1)) + \phi\}\right]^2} \quad \text{(c1)}$$

Here, a bend angle α1 of the first Cardan joint 16, a bend angle α2 of the second Cardan joint 20, and a phase difference ψ are used. The bend angle α1 of the first Cardan joint 16 is the angle between the axial direction of the column shaft 14 and the axial direction of the intermediate shaft 18. Further, the bend angle α2 of the second Cardan joint 20 is the angle between the axial direction of the intermediate shaft 18 and the axial direction of the pinion shaft 22. The phase difference ψ is "90−ξ+ε". Here, "ξ" is the angle between a plane parallel to both of the axial direction of the column shaft 14 and the axial direction of the intermediate shaft 18 and a plane parallel to both of the axial direction of the intermediate shaft 18 and the axial direction of the pinion shaft 22. Further, "ε" is the phase difference between the second yoke 16*b* that is of the two yokes of the first Cardan joint 16 and that is on the intermediate shaft 18 side and the yoke that is of the two yokes of the second Cardan joint 20 and that is on the intermediate shaft 18 side. The phase difference indicates a gap in rotational angle around the axial direction of the intermediate shaft 18.

According to the above Expression (c1), for example, in the case where the torque that is given to the pinion shaft 22 is constant without depending on the steering angle θh, the steering torque Th can vary depending on the steering angle θh. In the case where the steering torque Th varies depending on the steering angle θh, the driver can have a feeling of strangeness about the manipulation of the steering wheel 12. A control for coping with this will be described below.

Torque Control for Assist Motor

FIG. 3 shows processes that are executed by the control device 50. The processes shown in FIG. 3 are realized when the PU 52 repeatedly executes an assist control program 54*a* stored in the storage device 54, for example, with a predetermined period.

Manual Steering Process

First, a process when the superior ECU 80 does not perform steering intervention will be described below. In other words, a manual steering process will be described. A detection value acquisition process M10 is a process of acquiring the detection value Trq by the torque sensor 72 with a predetermined sampling period.

A torque calculation process M12 is a process of calculating a motor torque Tm that is a torque generated in the assist motor 42, based on the electric currents iu, iv, iw that flow through the assist motor 42. Actually, the motor torque Tm is a torque resulting from converting the torque of the assist motor 42 into the torque of the pinion shaft 22.

An addition process M14 is a process of adding the detection value Trq and the motor torque Tm. A motor angle acquisition process M16 is a process of calculating the rotation angle θm of a rotation shaft of the assist motor 42 with a predetermined sampling period.

A pinion angle calculation process M18 is a process of calculating a pinion angle θp that is the rotation angle of the pinion shaft 22, based on the rotation angle θm as an input variable. A differential operator M20 is a process of calculating a first-order time-differential value based on the pinion angle θp as an input variable.

A differential operator M22 is a process of calculating a first-order time-differential value based on the output value of the differential operator M20 as an input variable. An inertia term calculation process M24 is a process of outputting an inertia term Gp that is a value resulting from multiplying the output value of the differential operator M22 by an inertia coefficient J. The output value of the differential operator M22 is a second-order time-differential value of the pinion angle θp, and therefore, the output value of the inertia term calculation process M24 corresponds to the inertia torque of the turning device 10.

A subtraction process M26 is a process of subtracting the output value of the inertia term calculation process M24 from the output value of the addition process M14. A steering angle calculation process M30 is a process of calculating the steering angle θh based on the pinion angle θp as an input variable. The steering angle calculation process M30 is a process of calculating the steering angle θh using a mapping that is prescribed by mapping data 54*b* stored in the storage device 54 shown in FIG. 1. The mapping is a mapping that receives the pinion angle θp as an input and that outputs the steering angle θh. The mapping is prescribed by the following Expression (c2).

$$\theta h = -\arctan\frac{\tan\left[-\arctan\left\{\frac{\tan(\theta p + \arctan(\tan\phi \cdot \cos\alpha 2))}{\cos\alpha 2}\right\} + \phi\right]}{\cos\alpha 1} \quad \text{(c2)}$$

The above expression is derived by applying an expression that prescribes the relation between the rotation angles and bend angles of a pair of the yokes of a Cardan joint, to the first Cardan joint 16 and the second Cardan joint 20.

That is, the above expression is derived by using a simultaneous equation including the following expressions (c3) and (c4).

$$\tan\theta 2 = \cos\alpha 1 \cdot \tan\theta h \quad (c3)$$

$$\tan(\theta p') = \cos\alpha 2 \cdot \tan(\theta 2 + \psi) \quad (c4)$$

The above "θ2" is the rotation angle of the intermediate shaft 18. Further, "θp'" indicates the phase difference of the pinion angle θp from "θh". Specifically, the following Expression (c5) is derived from Expression (c3) and Expression (c4).

$$\theta p' = \arctan(\tan[\arctan\{\tan(\theta h) \cdot \cos(\alpha 1)\} + \psi] \cdot \cos(\alpha 2)) \quad (c5)$$

Accordingly, the pinion angle θp is expressed as the following Expression (c6).

$$\theta p = \theta p' - \arctan\{\tan(\psi) \cdot \cos(\alpha 2)\} \quad (c6)$$

The above Expression (c2) is derived by eliminating θp' from Expression (c5) and Expression (c6).

The mapping data 54*b* includes data about values of the first bend angle α1, the second bend angle α2, and the phase difference ψ, and the like. The above Expression (c1) is calculated based on the ratio between a first-order time-differential value of the steering angle $\theta_h$ and the first-order time-differential value of the pinion angle θp and an expression for energy conservation. The first-order time-differential value of the steering angle $\theta_h$ can be calculated by the time differential of the above Expression (c2)

A rigidity coefficient multiplication process M31 is a process of multiplying the detection value Trq by the reciprocal of a rigidity coefficient K. The rigidity coefficient K is a coefficient indicating the torsional rigidity of the torsion bar. A steering angle correction process M33 is a process of correcting the steering angle θh by multiplying the steering angle θh output by the steering angle calculation process M30 by the output value of the rigidity coefficient multiplication process M31. The steering angle θh determined from the above Expression (c2) deviates from the actual steering angle by the torsional amount of the torsion bar. An amount resulting from multiplying the detection value Trq by the reciprocal of the rigidity coefficient K is an estimated value of the torsional amount of the torsion bar.

A ratio calculation process M32 is a process of calculating the ratio f(θh) between the torque of the pinion shaft 22 and the steering torque Th. For example, the ratio f(θh) may be expressed as the above Expression (c1). That is, the ratio f(θh) may be calculated by the PU 52 using Expression (c1), by storing data prescribing the above Expression (c1) in the storage device 54. Further, for example, the map computation of the ratio f(θh) may be performed by the PU 52, in a state where map data is previously stored in the storage device 54. The map data is data in which the steering angle θh is adopted as an input variable and the ratio f(θh) is adopted as an output variable.

The map data is combination data of discrete values of the input variable and values of the output variable that correspond to the respective values of the input variable. Further, in the map computation, in the case where the value of the input variable coincides with one of the values of the input variable in the map data, the corresponding value of the output variable in the map data may be adopted as the computation result. Further, in the map computation, in the case where the value of the input variable does not coincide with any of the values of the input variable in the map data, a value obtained by the interpolation with a plurality of values of the output variable that is included in the map data may be adopted as the computation result. Alternatively, in the map computation, in the case where the value of the input variable does not coincide with any of the values of the input variable in the map data, the closest value of the plurality of values of the input variable that is included in the map data may be adopted, and the corresponding value of the output variable in the map data may be adopted as the computation result.

A division process M34 is a process of calculating the reciprocal of the ratio f(θh). A subtraction process M36 is a process of subtracting the output value of the division process M34 from "1". A compensation torque calculation process M38 is a process of calculating a Cardan joint compensation torque Tcjc by multiplying the output value of the subtraction process M26 and the output value of the subtraction process M36.

A steering torque calculation process M40 is a process of calculating the steering torque Th by multiplying the detection value Trq by the ratio f(θh). A basic assist torque calculation process M42 is a process of calculating a basic assist torque Tb based on the steering torque Th as an input variable. That is, the basic assist torque calculation process M42 is a process of changing the basic assist torque Tb depending on driver's steering intention indicated by the steering torque Th.

A variation torque calculation process M44 is a process of calculating a variation torque Tbc by dividing the basic assist torque Tb by the ratio f(θh). A superimposition process M46 is a process of calculating an assist torque Ta by adding the variation torque Tbc and the Cardan joint compensation torque Tcjc.

A manipulation signal output process M48 is a process of generating and outputting a manipulation signal MS of the inverter 60 for controlling the torque of the assist motor 42 to the assist torque Ta. Actually, the manipulation signal MS is a manipulation signal for each switching element of the inverter 60.

Case of Steering Intervention

In FIG. 3, a process when steering intervention is performed will be described below. A control torque calculation process M50 is a process of calculating a control torque Tdc based on a target pinion angle θp* and the pinion angle θp as input variables. The target pinion angle θp* is a value that is calculated by the superior ECU 80 for controlling the traveling direction of the vehicle. The control torque Tdc is a manipulated amount in a feedback control in which the pinion angle θp is a controlled amount and the target pinon angle θp* is a target value of the controlled amount.

A compensation torque restriction process M60 is a process of restricting the magnitude of the Cardan joint compensation torque Tcjc to a small side. Specifically, the compensation torque restriction process M60 is a process of correcting the Cardan joint compensation torque Tcjc by multiplying the output value of the compensation torque calculation process M38 by a gain G.

An amplitude restriction process M62 is a process of restricting the amplitude of the ratio f to a small side. Specifically, the amplitude restriction process M62 is a process of substituting the sum of a value resulting from multiplying the ratio f output by the ratio calculation process M32 by the gain G and "1−G", in the ratio f.

Figures 4, 5:
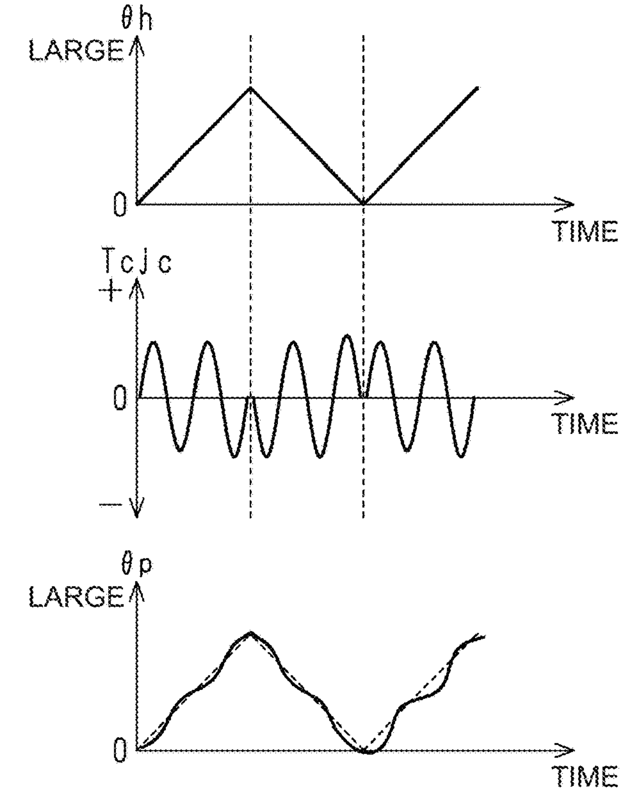
FIG. 4 is a flowchart showing the procedure of a process relevant to the setting of a gain in the processes in FIG. 3.
FIG. 5 is a time chart showing an effect of the embodiment.

FIG. 4 shows the procedure of a process of setting the gain G that is used for the restriction in the compensation torque restriction process M60 and the amplitude restriction process M62. The process shown in FIG. 4 is realized when the PU 52 repeatedly executes a program stored in the storage device 54, for example, with a predetermined period. Hereinafter, step numbers of processes are expressed as numerals to each of which "S" is added as the initial character.

In a sequence of processes shown in FIG. 4, first, the PU 52 determines whether the control mode is a trackability priority mode (S10). The trackability priority mode is a mode in which priority is given to the trackability of the control of the traveling direction of the vehicle by the superior ECU 80, over the steering feeling caused by the manipulation of the steering wheel 12 by the driver. In the case where the PU 52 determines that the control mode is the trackability priority mode (S10: YES), the PU 52 determines whether the absolute value of the steering torque Th is larger than or equal to a first threshold ThthH (S12). In the case where the PU 52 determines that the absolute value of the steering torque Th is larger than or equal to the first threshold ThthH (S12: YES), the PU 52 switches the control mode to a steering-feeling priority mode (S14). The steering-feeling priority mode is a mode in which priority is given to the steering feeling caused by the manipulation of the steering wheel 12 by the driver, over the trackability of the control of the traveling direction. Then, the PU 52 substitutes one that is of two values: a value resulting from adding a predetermined positive amount Δ to the gain G and 1 and that is not larger than the other, in the gain G (S16).

On the other hand, in the case where the PU 52 determines that the control mode is not the trackability priority mode (S10: NO), the PU 52 determines whether the logical sum of the following condition (A) and condition (B) is true (S18).

Condition (A): A condition that the absolute value of the steering torque Th is smaller than or equal to a second threshold ThthL. The second threshold ThthL is smaller than the first threshold ThthH.

Condition (B): A condition that there is an emergency avoidance request. The emergency avoidance request is a request to avoid the vehicle from colliding with a physical body at a traveling-directional forward position. The superior ECU 80 monitors whether the vehicle is in a state of colliding with the physical body at the traveling-directional forward position, based on the image data about the traveling-directional forward view that is acquired by the camera 84. Then, in the case where the superior ECU 80 determines that the vehicle can collide with the physical body at the traveling-directional forward position, the superior ECU 80 determines that there is the emergency avoidance request. The superior ECU 80 outputs a signal indicating that there is the emergency avoidance request, to the control device 50. In the case where the PU 52 receives the signal from the superior ECU 80, the PU 52 determines that the condition (B) is satisfied.

In the case where the PU 52 determines that the above logical sum is false (S18: NO), the PU 52 transitions to the process of S16. On the other hand, in the case where the PU 52 determines that the above logical sum is true (S18: YES), the PU 52 sets the control mode to the trackability priority mode (S20). In the case where the PU 52 completes the process in S20 or makes the negative determination in the process of S12, the PU 52 substitutes one that is of two values: a value resulting from subtracting the predetermined amount Δ from the gain G and 0 and that is not smaller than the other, in the gain G (S22).

In the case where the PU 52 completes the process of S16 or S22, the PU 52 ends the sequence of processes shown in FIG. 4 once.

Operation and Effect of Embodiment

The following Expression (c5) is a motion equation for the pinion shaft 22.

$$Trq + Tm = Gp + Tp \tag{c5}$$

Here, the inertia term Gp is an inertia term of the torque of the pinion shaft 22. Further, a torque Tp is a torque other than the inertia term Gp that is given to the pinion shaft 22.

The above Expression (c5) can be expressed as the following Expression (c6).

$$Trq = Gp + Tp - Tm \tag{c6}$$

When the ratio f(θh) in the above Expression (c1) is used, the steering torque Th can be expressed as the following Expression (c7).

$$Th = f(\theta h) \cdot (Gp + Tp - Tm) \tag{c7}$$

The motor torque Tm that is the assist torque is expressed as Expression (c8).

$$Tm = Tbc + \{1 - (1/f(\theta h))\} \cdot Tp \tag{c8}$$

When the above Expression (c8) is substituted in the above Expression (c7), the following Expression (c9) is obtained.

$$Th = Tp + f(\theta h) \cdot (Gp - Tbc) \tag{c9}$$

When "Tbc=Tb/f(θh)" is substituted in the above Expression (c9), the following Expression (c10) is obtained.

$$Th = Tp - Tb + f(\theta h) \cdot Gp \tag{c10}$$

In the above Expression (c10), when the term "f(θh). Gp" is ignored, the ratio between the steering torque Th and "Tp−Tb" does not depend on the steering angle θh.

Therefore, when the variation in the torque Tp depending on the steering angle θh is small, it is possible to restrain the steering torque Th from varying depending on the steering angle θh. Therefore, in the embodiment, the motor torque Tm is set to the sum of the variation torque Tbc and the Cardan joint compensation torque Tcjc. That is, the Cardan joint compensation torque Tcjc is the second term in the right-hand member of the above Expression (c8).

In this way, the assist torque Ta is set depending on the Cardan joint compensation torque Tcjc and the like, and thereby, it is possible to restrain the steering torque Th from periodically varying depending on the steering angle θh. Therefore, the control makes it possible to restrain the decrease in steering feeling due to the structure of the steering device.

The control torque Tdc is superimposed on the assist torque Ta. The control torque Tdc is a torque that is requested for causing the vehicle to appropriately travel or avoiding a crisis situation. For example, in the case where the vehicle is about to depart from a lane, the control torque Tdc becomes a value that makes it possible to restrain the vehicle from departing from the lane by the fine adjustment of the steering by the driver. However, the control torque Tdc and the Cardan joint compensation torque Tcjc can interfere with each other. That is, the actual behavior of the vehicle can deviate from a behavior of the vehicle that is intended by the control torque Tdc due to the Cardan joint compensation torque Tcjc.

Hence, in the case where the control mode switches from the steering-feeling priority more to the trackability priority mode, the PU 52 sets the gain G to zero. Thereby, the Cardan joint compensation torque Tcjc that is input to the superimposition process M46 by the compensation torque restriction process M60 is set to zero. Therefore, it is possible to restrain the traveling intended by the superior ECU 80 from being hindered by the Cardan joint compensation torque Tcjc when priority should be given to the traveling control of the vehicle by the superior ECU 80. Further, when the gain G is set to zero, the ratio f that is input to the steering torque calculation process M40 and the division process M34 by the amplitude restriction process M62 is set to 1. Therefore, the steering torque Th becomes equal to the detection value Trq. In other words, the amplitude of the periodical variation in the detection value Trq depending on the steering angle θh is set to zero.

FIG. 5 exemplifies the transitions of the steering angle θh, the Cardan joint compensation torque Tcjc, and the pinion angle θp in the steering-feeling priority mode. As shown in FIG. 5, in the case where the Cardan joint compensation torque Tcjc is periodically varied depending on the steering angle θh, the pinion angle θp varies due to the Cardan joint compensation torque Tcjc as shown by a solid line.

FIG. 6 exemplifies the change in control mode. In a sequence of processes shown in FIG. 6, at time t1, the absolute value of the steering torque Th becomes larger than or equal to the first threshold ThthH, and thereby, the gain G gradually increases to 1. Further, at time t2, the absolute value of the steering torque Th becomes smaller than or equal to the second threshold ThthL, and thereby, the gain G gradually decreases to 0. In the case where the gain G is zero, the Cardan joint compensation torque Tcjc is set to zero, so that the minute variation in the pinion angle θp is restrained.

With the embodiment, the following operations and effects are further obtained. (1) The PU 52 recognizes the priority degrees of the steering of by the driver and the steering by the control torque Tdc, depending on the steering torque Th. The steering torque Th is a variable indicating driver's steering intention, and therefore, the steering torque Th is a variable appropriate to determine the priority degrees of the steering by the driver and the steering by the control torque Tdc. Therefore, it is possible to appropriately set the priority degrees.

(2) The PU 52 recognizes the priority degrees of the steering by the driver depending on the steering torque Th and the steering by the control torque Tdc, depending on whether the emergency avoidance request is generated. In the case where the emergency avoidance request is generated, it is thought that a circumstance in which priority is given to the control torque Tdc regardless of driver's steering intention has occurred. Therefore, the PU 52 can appropriately set the priority degrees by considering whether there is the emergency avoidance request.

(3) In the case where the control mode switches from the steering-feeling priority mode to the trackability priority mode, the PU 52 gradually decreases the gain G to zero. Thereby, it is possible to perform the transition to a state where the controllability with the control torque Tdc becomes high, while avoiding a sudden change in control state.

(4) In the case where the control mode switches from the trackability priority mode to the steering-feeling priority mode, the PU 52 gradually increases the gain G to 1. Thereby, it is possible to perform the transition to a state where the variation that is given to the steering wheel 12 is restrained, while avoiding a sudden change in control state.

Second Embodiment

A second embodiment will be described below mainly about differences from the first embodiment, with reference to the drawings.

FIG. 7 shows processes that are executed by the control device 50 in the embodiment. The processes shown in FIG. 7 are realized when the PU 52 repeatedly executes the assist control program 54*a* stored in the storage device 54, for example, with a predetermined period. In FIG. 7, processes corresponding to processes shown in FIG. 3 are denoted by identical reference characters, for convenience purpose.

As shown in FIG. 7, in the embodiment, although the amplitude restriction process M62 is provided, the compensation torque restriction process M60 is not employed. In this case, when the gain G is set to zero in the trackability priority mode, the output value of the subtraction process M36 is zero. Therefore, the output value of the compensation torque calculation process M38 is zero. Accordingly, the Cardan joint compensation torque Tcjc is zero.

Correspondence Relation

The correspondence relation between matters in the above embodiments and matters described in "SUMMARY" is shown as follows. The column shaft 14 is an example of the input shaft. The pinion shaft 22 is an example of the output shaft. The steering angle calculation process M30, the rigidity coefficient multiplication process M31, and the steering angle correction process M33 constitute an example of the rudder angle variable acquisition process. The basic assist torque calculation process M42 is an example of the assist torque variable calculation process. The control torque calculation process M50 is an example of the control torque acquisition process. The manipulation signal output process M48 is an example of the manipulation process. The inverter 60 is an example of the drive circuit. The process of calculating the Cardan joint compensation torque Tcjc and the variation torque Tbc is an example of the variation torque control process. The compensation torque restriction process M60 and the amplitude restriction process M62 constitutes an example of the restriction process. S12 and S18 constitute an example of the steering torque variable acquisition process. The emergency avoidance request signal is an example of the signal that determines the priority degree of the control torque depending on the information about the exterior of the vehicle. The process of S22 is an example of the process of the gradual decrease to zero. The process of S16 is an example of the process of the gradual increase. The addition of the control torque Tdc to the variation torque Tbc is an example of the superimposition process M46.

OTHER EMBODIMENTS

The embodiment can be carried out while being modified as follows. The embodiment and the following modifications can be carried out while being combined with each other as long as there is no technical inconsistency.

Restriction Process

It is not essential that the restriction process is a process of gradually changing the gain G depending on time. For example, a process of changing the magnitude of the gain G in a range of "0" or more and "1" or less depending on the magnitude of the absolute value of the steering torque Th may be adopted.

It is not essential that the restriction process is a process of changing the gain G in a stepwise manner. For example, the restriction process is a process of always setting the gain G to one value of the two values, the value "0" and the value "1".

Control Torque Acquisition Process

It is not essential that the control torque acquisition process is the control torque calculation process M50. For example, the superior ECU 80 may output the control torque Tdc to the control device 50, and the PU 52 may execute a process of receiving the control torque Tdc.

Control Torque

It is not essential that the control torque Tdc is the torque that is superimposed on the variation torque Tbc. For example, the control torque Tdc may be a torque for causing the vehicle to autonomously travel in a state where the driver does not hold the steering wheel 12.

Rudder Angle Variable Acquisition Process

In the above embodiment, the steering angle θh is estimated based on the pinion angle θp as an input variable, but the present disclosure is not limited to this. For example, the displacement amount of the rack shaft 30 in the axial direction of the rack shaft 30 may be used instead of the pinion angle θp.

Basic Assist Torque Calculation Process

The basic assist torque calculation process M42 of calculating the basic assist torque Tb that does not depend on the steering angle θh is not essential. For example, a process of directly calculating the variation torque Tbc using the steering torque Th and the steering angle θh as inputs may be adopted. This process constitutes the assist torque variable calculation process and the variation torque restriction process.

First Bend Angle α1, Second Bend Angle α2

In the above embodiment, the first bend angle α1 and the second bend angle α2 are set to fixed values that are previously determined, but the present disclosure is not limited to this. For example, in the case where the height of the steering wheel 12 can be adjusted by the rotation of the column shaft 14 around a rotation center OT as shown by two-dot chain lines in FIG. 1, the first bend angle α1 and the second bend angle α2 may be set depending on the rotation amount of the column shaft 14. The cause of the change in the bend angles α1, α2 is not limited to the change in tilt angle. For example, the cause of the change in the bend angles α1, α2 may be the use of a telescopic function.

Turning Control Device

The control device 50 is not limited to a device that includes the PU 52 and the storage device 54 and that executes software processing. For example, a dedicated hardware circuit (for example, an ASIC) that executes at least some of the processes that are executed in the above embodiment may be included. That is, the turning control device only needs to include a processing circuit having one configuration of the following (a) to (c). (a) A processing circuit including a processing device that executes all of the above processes in accordance with programs and a program storing device that stores programs, as exemplified by a ROM. (b) A processing circuit including a processing device that executes some of the above processes in accordance with programs, a program storing device, and a dedicated hardware circuit that executes the other processes. (c) A processing circuit including a dedicated hardware circuit that executes all of the above processes. A plurality of software processing circuits each of which a processing device and a program storing device may be provided, and a plurality of dedicated hardware circuits may be provided. That is, the above processes only need to be executed by a processing circuit that includes at least one of a single or a plurality of software processing circuits and a single or a plurality of dedicated hardware circuits.

Turning Device

The present disclosure is not limited to the configuration in which the rotation shaft of the assist motor 42 and the rack shaft 30 are disposed so as to be parallel to each other. For example, a second rack-and-pinion mechanism may be included separately from the rack-and-pinion mechanism 32, and the torque of the assist motor 42 may be given through the second rack-and-pinion mechanism.

Others

It is not essential that the steering angle θh as the input in the ratio calculation process M32 is the output value of the steering angle correction process M33. For example, the steering angle θh output by the steering angle calculation process M30 may be adopted as the input in the ratio calculation process M32.

What is claimed is:

1. A turning control device configured to control a turning device, the turning device including a steering wheel, an input shaft, an intermediate shaft, an output shaft, a first Cardan joint, a second Cardan joint, an assist motor, and a turning wheel, the input shaft being coupled to the steering wheel, the first Cardan joint being a member that couples the input shaft and the intermediate shaft, the second Cardan joint being a member that couples the intermediate shaft and the output shaft, the turning wheel being a member to which a steering torque input to the steering wheel is transmitted through the input shaft, the intermediate shaft, and the output shaft, and the assist motor being a motor configured to give a torque to a position that is closer to the turning wheel than the second Cardan joint is, the turning control device comprising a processor configured to execute a rudder angle variable acquisition process, an assist torque variable calculation process, a control torque acquisition process, a manipulation process, a variation torque control process, and a restriction process, wherein:

the rudder angle variable acquisition process is a process of acquiring a value of a steering angle variable, the steering angle variable being a variable indicating a steering angle that is an angle of the steering wheel;

the assist torque variable calculation process is a process of calculating a value of an assist torque variable, the assist torque variable being a variable indicating a torque for assisting steering by a driver depending on manipulation of the steering wheel;

the control torque acquisition process is a process of acquiring a value of a control torque variable, the control torque variable being a variable indicating a torque for controlling a traveling direction of a vehicle independently from the manipulation of the steering wheel;

the manipulation process is a process of manipulating a drive circuit of the assist motor depending on a torque that depends on at least one of the two values, the value of the assist torque variable and the value of the control torque variable;

the variation torque control process is a process of varying a torque as an input variable in the manipulation process, depending on the steering angle, based on the value of the steering angle variable as an input variable; and the restriction process is a process of restricting a magnitude of variation in the torque as the input variable in the manipulation process depending on the steering angle, to a small side, depending on a priority degree of the value of the control torque variable in the manipulation process.

2. The turning control device according to claim 1, wherein:

the processor is configured to execute a steering torque variable acquisition process, the steering torque variable acquisition process being a process of acquiring a value of a steering torque variable that is a variable indicating the steering torque; and the restriction process includes a process of recognizing the priority degree depending on the value of the steering torque variable as an input variable.

3. The turning control device according to claim 1, wherein the restriction process includes a process of recognizing the priority degree of the value of the control torque variable, based on a signal that determines the priority degree of the value of the control torque variable depending on information about an exterior of the vehicle.

4. The turning control device according to claim 1, wherein the restriction process includes a process of gradually decreasing the magnitude of the variation to zero, at a time of switching from a state where the priority degree of the value of the control torque variable is lower than a priority degree of the value of the assist torque variable to a state where the priority degree of the value of the control torque variable is higher than the priority degree of the value of the assist torque variable.

5. The turning control device according to claim 1, wherein the restriction process includes a process of gradually increasing the magnitude of the variation from zero, at a time of switching from a state where the priority degree of the value of the control torque variable is higher than a priority degree of the value of the assist torque variable to a state where the priority degree of the value of the control torque variable is lower than the priority degree of the value of the assist torque variable.

6. The turning control device according to claim 1, wherein the value of the control torque variable is a torque that is added to the value of the assist torque variable for correcting the steering depending on the manipulation of the steering wheel.

* * * * *